US005315582A

United States Patent [19]
Morizono et al.

[11] Patent Number: 5,315,582
[45] Date of Patent: May 24, 1994

[54] COMMUNICATIONS SYSTEM BETWEEN LAN'S OF DIFFERENT TYPES

[75] Inventors: Toshiaki Morizono; Takaaki Suga, both of Kawasaki, Japan

[73] Assignee: Fujitsu Limited, Kanagawa, Japan

[21] Appl. No.: 752,549

[22] PCT Filed: Jan. 25, 1991

[86] PCT No.: PCT/JP91/00081
§ 371 Date: Sep. 25, 1991
§ 102(e) Date: Sep. 25, 1991

[87] PCT Pub. No.: WO 91/11869
PCT Pub. Date: Aug. 8, 1991

[30] Foreign Application Priority Data
Jan. 26, 1990 [JP] Japan .................. 2-14786

[51] Int. Cl.$^5$ .............................................. H04J 3/14
[52] U.S. Cl. ................................... 370/16; 370/16.1;
370/85.5; 370/85.12; 370/85.14; 371/8.2
[58] Field of Search ............... 370/85.5, 85.12, 85.14, 370/16, 16.1; 371/8.2

[56] References Cited

U.S. PATENT DOCUMENTS

| 4,594,709 | 6/1986 | Yasue ........................... 370/16 X |
| 4,709,365 | 11/1987 | Beale et al. ................... 370/16 X |
| 4,951,280 | 8/1990 | McCool et al. ............ 370/85.14 X |
| 5,107,490 | 4/1992 | Wilson et al. ............... 370/85.5 X |

FOREIGN PATENT DOCUMENTS

| 244775 | 11/1987 | European Pat. Off. ...... H04L 11/16 |
| 0269978 | 6/1988 | European Pat. Off. ...... H04L 11/16 |
| 321907 | 6/1989 | European Pat. Off. ...... H04L 11/16 |
| 59-37753 | 3/1984 | Japan . |
| 60-10839 | 1/1985 | Japan . |
| 59-241037 | 6/1986 | Japan . |

OTHER PUBLICATIONS

Mantelman, L., "Incompatible bridges stymie use of FDDI as LAN backbone", *Data Communications*, vol. 18, No. 11, Sep. 1989, pp. 39-44.

Varghese, G. et al., "Transparent Interconnection of Incompatible Local Area Networks Using Bridges", *IEEE Journal on Selected Areas in Communication*, vol. 8, No. 1, Jan. 1990, pp. 42-48.

Miyazawa, M. et al., "A High-Speed Hierarchical Integrated Optical LAN System", *Review of the Electrical Communication Laboratories*, vol. 37, No. 2, Mar. 1989, pp. 99-107.

Supplemental Partial European Search Report, The Hauge, Sep. 30, 1992.

European Search Report, The Hague, mailed Mar. 1, 1993.

*Primary Examiner*—Douglas W. Olms
*Assistant Examiner*—Russell W. Blum
*Attorney, Agent, or Firm*—Staas & Halsey

[57] ABSTRACT

A communications system between LANs of different types constituted of a backbone LAN (1) and a plurality of branch LANs (7, 7') connected to said backbone LAN (1) through a node (2A, 2B, 2C, 2D). A branch LAN frame (30) delivered from a terminal (8, 9, 10, 15, 18, 21) is incorporated into a backbone LAN frame (40) in the node (2A, 2B, 2C, 2D), and in response to the incorporation, the address of the adjoining node on the downstream side of its own node is given to the backbone LAN frame (40), and thus, the backbone LAN frame (40) is transmitted through the backbone LAN (1). Each node (2A, 2B, 2C, 2D), when the address in the backbone LAN frame (40) agrees with its own address, separates the branch LAN frame (30) from the backbone LAN frame (40).

9 Claims, 8 Drawing Sheets

1

COMMUNICATIONS SYSTEM BETWEEN LAN'S OF DIFFERENT TYPES

TECHNICAL FIELD

The present invention relates to a communications system between LANs of different types in which the communications network is constituted of a backbone LAN with a plurality of branch LANs such as token ring LANs connected thereto and the overall communications network virtually looks like a single loop LAN.

BACKGROUND ART

With the progress of the information society, communications networks are playing the role of the nervous system of a wide variety of social and economical activities and great importance is placed especially on their reliability. Lately, there are increasing demands for a backbone LAN capable of accommodating medium-arid small-scale branch LANs and integrated processing of data, voice, and image, and some backbone LANs to meet such demands are being produced as multiple-media backbone LANs.

On the other hand, high speed data transfer between host computers has come to be demanded with the progress of horizontal distribution of computer processing. To meet such demand, a token ring LAN having a channel interface capable of being directly incorporated into a host computer is made available. Accordingly, as a means for achieving high-speed transfer within a multiple-media backbone LAN, it becomes necessary to have branch LANs such as token ring LANs incorporated in the multiple-media backbone LAN.

Conventionally, when a plurality of branch LANs such as token ring LANs have to be connected to a backbone LAN, the connection between these LANs has been achieved in general by means of a bridge function whereby a small loop is connected to a large loop through a node.

When communications are made between branch LANs connected as described above, one branch LAN sends a token ring frame to the backbone LAN. Then, the node of the backbone LAN reads the address data in the token ring frame and retrieves the address of the node to which the branch LAN located at the read address is connected, puts the address into the backbone LAN frame, and incorporates the token ring frame into the backbone LAN frame, arid thereupon, sends the backbone LAN frame to the destination node. The node at the destination separates the token ring frame from the backbone LAN frame and transmits the token ring frame to the terminal unit having its address concurring with the address in the token ring frame.

In the above described conventional communications system between LANs of different types, since the communication is performed such that the node reads the address data of the destination of the token ring frame, retrieves the node with which the terminal having that address is connected, and puts the address of that node into the backbone LAN frame, the node is heavily loaded, and this has been a cause impairing high-speed large-capacity communications between branch LANs. Hence, even if the transmission capacity of the backbone LAN is 100 Mbps, for example, throughput at 100 Mbps has not been attainable. Thus, there has been a problem that the capacity of the node is insufficient to attain high-speed large-capacity communications between host computers connected to each of the branch LANs.

Accordingly, an object of the present invention is to provide a communications system between LANs of different types capable of overcoming the above described problem in the prior art arid properly achieving high-speed large-capacity communications between branch LANs by way of a backbone LAN.

DISCLOSURE OF THE INVENTION

In accordance with an aspect of the present invention, there is provided a communications system between LANs of different types constituted of a backbone LAN structured of a plurality of nodes connected to form a ring through backbone LAN transmission lines of a dual structure, in which a pair of transmission lines are laid, and a plurality of branch LANs, each thereof having terminals connected thereto, connected to the backbone LAN (1) through each node, said communications system being adapted such that a branch LAN frame with the addresses of terminals communicating with each other given thereto is transmitted through the branch LANs and a backbone LAN frame with the address of a destination node given thereto is circulated through the backbone LAN comprising: means provided in each of the nodes for incorporating the branch LAN frame, delivered from the terminal of the branch LAN, into the backbone LAN frame; means provided in each of the nodes for giving the address of the adjoining node on the downstream side of its own node to the backbone LAN frame in response to the incorporation of the branch LAN frame into the backbone LAN frame; means provided in each of the nodes for reading the address in the backbone LAN frame; and means provided in each of the nodes for separating the branch LAN frame from the backbone LAN frame when the address in the backbone LAN frame read by the address reading means agrees with its own address; whereby the branch LAN frame is adapted to be transmitted through the terminal in 1 predetermined sequence.

Preferably, the backbone LAN frame is formed of a data field for holding tile branch LAN frame, a destination address field into which the address of the node to which the backbone LAN frame is to be delivered next is written, a message field for holding a message indicating that the branch LAN frame is incorporated therein, and a failure information field for holding failure information.

For example, the branch LANs are token ring LANs and the branch LAN frame is a token ring frame which is formed of a data field for holding data, an address field for holding the address data of the terminal on the transmission side and the address data of the terminal on the reception side, and a token indicating that a specific terminal has the access authority.

More preferably, each node further includes means for failure processing responsive to the failure information in the failure information field for changing the path through which the backbone LAN frame and/or the branch LAN frame is transmitted. Thereby, even when a failure occurs in any of the transmission lines of the backbone LAN and the branch LAN, the branch LAN frame can be transmitted through all of the terminals in a predetermined sequence.

BEST MODE FOR CARRYING OUT THE INVENTION

An embodiment of the present invention will be described below with reference to the accompanying drawings.

Figure 1:
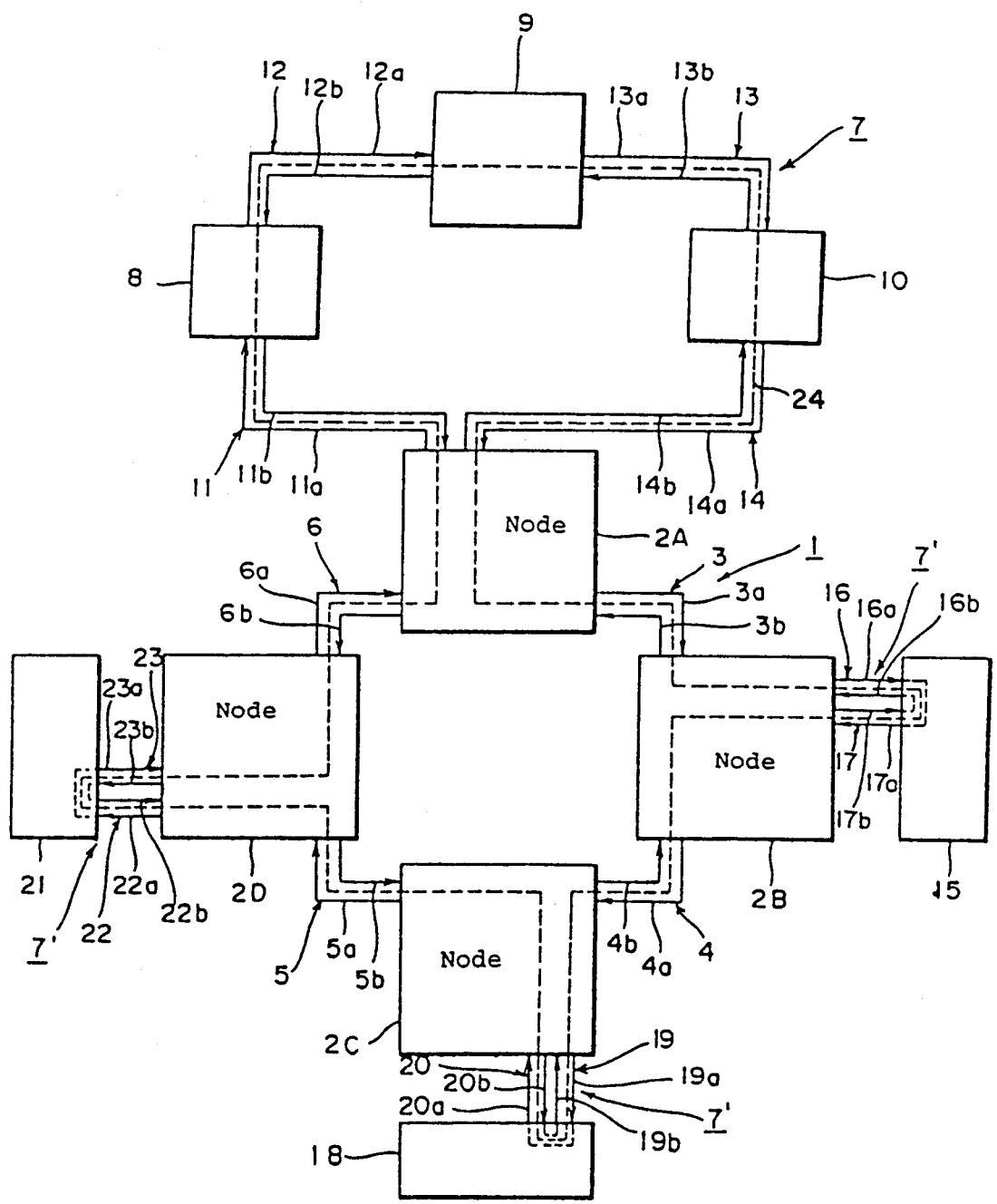
FIG. 1 is a schematic structural diagram of a communications system between LANs of different types according to an embodiment of the present invention.

Referring first to FIG. 1, reference numeral 1 denotes a backbone LAN as the main member of the system. The backbone LAN I is made up of first to fourth nodes 2A, 2B, 2C, and 2D having later described data transferring function and failure processing function and transmission lines 3, 4, 5, and 6 connecting the nodes in a ring form. Each transmission line 3 - 6 is arranged in a dual structure in which a first transmission line 3a-6a and a second transmission line 3b-6b are laid in parallel. Through the first transmission line 3a to 6a, a signal is transmitted in a clockwise direction as indicated by the arrow, and through the second transmission line 3b to 6b, a signal is transmitted in a counterclockwise direction. The first node 2A of the backbone LAN 1 is connected with a token ring LAN 7. The token ring LAN 7 is made up of data processing first terminal 8, second terminal 9, and third terminal 10 connected by transmission lines 11, 12, 13, and 14, each of which is of a dual structure, with ends of the transmission lines 11 and 14 connected to the first node 2A.

The second node 2B of the backbone LAN 1 is connected with a fourth terminal 15 of a token ring LAN 7' through transmission lines 16 and 17 of a dual structure, and likely, the third node 2C is connected with a fifth terminal 18 of a token ring LAN 7' through transmission lines 19 and 20 of a dual structure and the fourth node 2D is connected with a sixth terminal 21 of a token ring LAN 7' through transmission lines 22 and 23 of a dual structure. Although it is arranged in the illustrated embodiment such that the token ring LANs 7' connected to the nodes 2B, 2C, and 2D are each connected with one terminal, a token ring LAN 7 having a plurality of terminals like that connected to the first node 2A may be connected to the nodes 2B, 2C, and 2D.

Figure 2A:
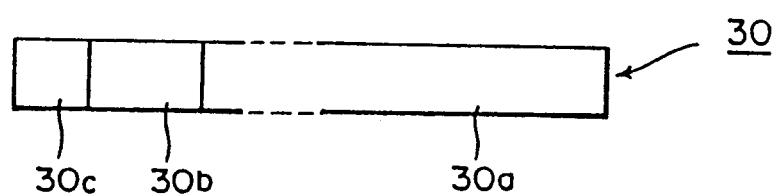
FIG. 2A is a structural diagram of a token ring frame.

In the communications system between LANs of different types structured as described above, there is formed a path in a loop (ring) form as indicated in FIG. 1 by the broken line 24 and, hence, it is possible to regard the communications system as a virtual token ring LAN. Through the path indicated by the broken line 24 of the communications system between LANs of different types, a token ring frame 30 as shown in FIG. 2A is transmitted. Through the transmission lines 3, 4, 5, and 6 of the backbone LAN 1, a backbone LAN frame 40 as shown in FIG. 2B is circulated.

The token ring frame 30 shown in FIG. 2A is structured of a data field 30a holding arbitrary data, an address field 30b holding address data of the terminal on the transmission side and address data of the terminal on the reception side, and a token 30c indicating which of the terminals 8, 9, 10, 15, 18, and 21 has the access authority. The token ring frame 30 is transmitted through the first to sixth terminals 8, 9, 10, 15, 18, and 21 in the named sequence.

Figure 2B:
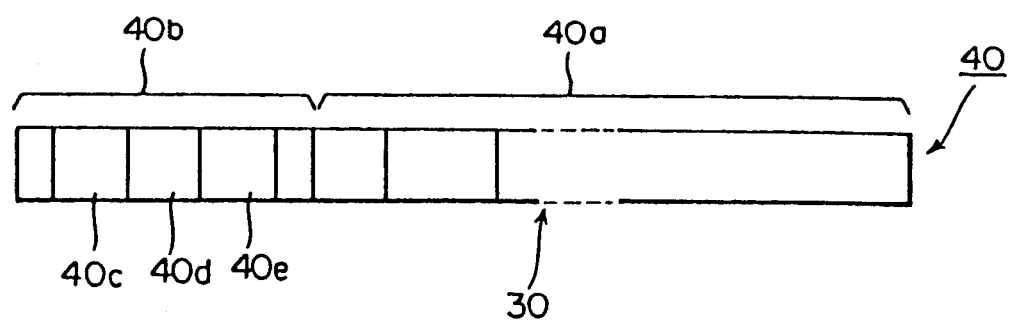
FIG. 2B is a structural diagram of a backbone LAN frame.

The backbone LAN frame 40 shown in FIG. 2B is transmitted through the transmission lines 3 to 6 through the nodes 2A to 2D of the backbone LAN 1 shown in FIG. 1 and it is structured of a data field 40a holding the token ring frame 30 and a frame header 40b. The frame header 40b is formed of a destination address field 40c for writing therein the address of the node to which the backbone LAN frame 40 is to be transferred next, a message field 40d for holding the message indicating that the token ring frame 30 is incorporated, and a failure information field 40e for holding failure information on a broken transmission line.

Figure 3:
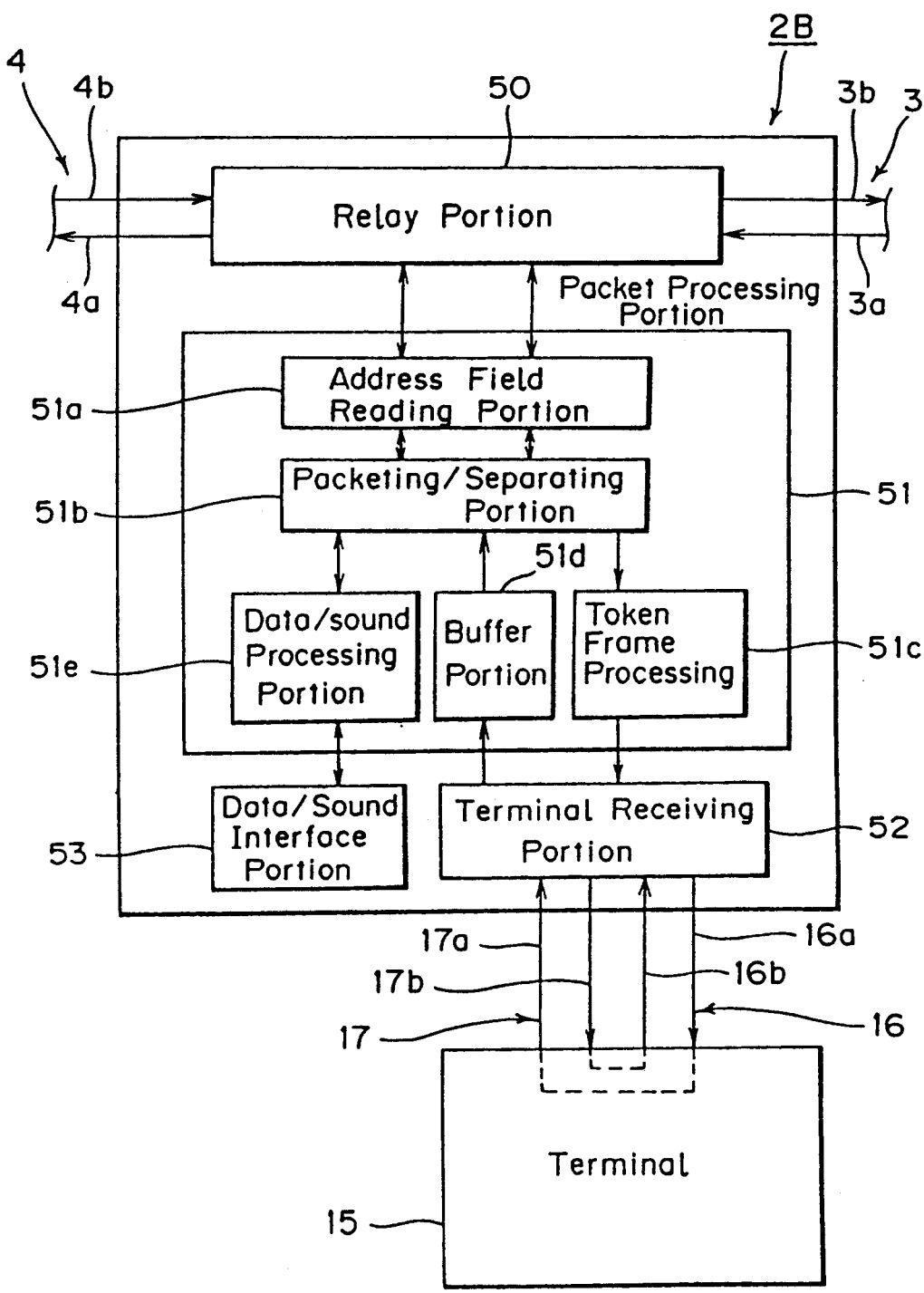
FIG. 3 is a block diagram showing a data transferring function of the node 2B shown in FIG. 1.

Referring now to FIG. 3, the structure of data transfer processing function of each of the nodes 2A to 2D will be described. Since the first to fourth nodes 2A to 2D have the same function, the structure of the second node 2B is shown in FIG. 3 for the convenience of explanation and description of the same will be given below.

Referring to FIG. 3, reference numeral 50 denotes a relay portion connecting the transmission line 3 with the transmission line 4. The relay portion 50 takes the backbone LAN frame 40 transmitted thereto through the transmission line 3a into a packet processing portion 51 and transmits the backbone LAN frame 40 from the packet processing portion 51 to the transmission line 4a. Otherwise, the relay portion 50 takes the backbone LAN frame 40 transmitted thereto through the transmission line 4b into a packet processing portion 51 and transmits the backbone LAN frame 40 from the packet processing portion 51 to the transmission line 3b.

The packet processing portion 51 is made up of an address field reading portion 51a, a packeting/separating portion 51b, a token frame processing portion 51c, a buffer portion 51d, and a data/sound processing portion 51e. The address field reading portion 51a reads the destination address in the destination address field 40c of the backbone LAN frame 40 and delivers the backbone LAN frame 40 to the packeting/separating portion 51b or the relay portion 50.

The packeting/separating portion 51b, when the address read in the address field reading portion 51a is the address of its own node, accepts the backbone LAN frame 40, takes out the token ring frame 30 incorporated in the frame 40 and delivers it to the token frame processing portion 51c. Further, the packeting/separating portion 51b takes out data and sound held in the token ring frame 30 and delivers them to the data/sound processing portion 51e. Otherwise, the packeting/separating portion 51b turns the token ring frame 30 delivered from the buffer portion 51d and data and sound signals output from the data/sound processing portion 51e into a packet and put the packet into the backbone LAN frame 40.

The token frame processing portion 51c is an interface portion between the packeting/separating portion 51b and a terminal receiving portion 52, and the buffer portion 51d is a portion storing the token ring frame 30 transmitted thereto through the terminal receiving portion 52. The data/voice processing portion 51e properly processes the data or voice and outputs the processed data to a data/sound interface portion 53 or the packeting/separating portion 51b.

The terminal receiving portion 52 is an interface portion between the packet processing portion 51 and the terminal 15 and includes later described failure processing portion and failure detecting portion. The data/sound interface portion 53 is an interface portion to which a telephone, a facsimile device, and analogous terminals, not shown, are connected.

Now, the operation of the communications system between LANs of different types arranged as described above at the time of data transfer will be described with reference to FIG. 1, FIG. 2A, FIG. 2B, and FIG. 3.

Referring to FIG. 1, when, for example, data is transmitted from the third terminal 10 to the fourth terminal 15, the token ring frame 30 delivered from the third terminal 10 is input to the first node 2A through the transmission line 14a. The token ring frame 30 received by the first node 2A is passed through the terminal receiving portion 52 and input, through the buffer portion 51d of the packet processing portion 51, to the packeting/separating portion 51b, and therein, it is turned into a packet and put into the data field 40a of the backbone LAN frame 40. At the same time, a message that the token ring frame 30 is incorporated is written into the message field 40d of the backbone LAN frame 40 and, further, the address indicating the destination for transmitting the backbone LAN frame 40 to the adjoining downstream second node 2B is set up in the address field 40c.

The backbone LAN frame 40 incorporating the token ring frame 30 is delivered, through the address field reading portion 51a and the relay portion 50, to the transmission line 3a, to be then circulated through the backbone LAN 1. In the second node 2B, the transmitted backbone LAN frame 40 is received at the relay portion 50, the address therein is read in the address field reading portion 51a, and if the frame 40 is addressed to itself, the token ring frame 30 is separated from the frame 40 in the packeting/separating portion 51b, but if the frame is not addressed to itself, the frame as it is is sent back to the relay portion 50. Thus, when the frame 40 is recognized to be that addressed to itself by the address field reading portion 51a, the information stored in the message field 40d is read, and if it is found that the token ring frame 30 is incorporated in the frame 40, the token ring frame 30 is separated from the backbone LAN frame 40 in the packeting/separating portion 51b. The thus separated token ring frame 30 is delivered to the fourth terminal 15 through the token frame processing portion 51c, the terminal receiving portion 52, and further through the transmission line 16a.

The packeting/separating portion 51b, after sending out the token ring frame 30, delivers the backbone LAN frame 40, without changing the address of itself which is set up in the destination address field 40c of the backbone LAN frame 40, to the transmission line 4a through the address field reading portion 51a and the relay portion 50. The thus delivered backbone LAN frame 40 is transmitted in an clockwise direction through the nodes 2C, 2D, 2A in succession. In each of the nodes 2C, 2D, and 2A, the address in the destination address field 40c of the backbone LAN frame 40 is read, and if it does not agree with the address of itself, the backbone LAN frame 40 as it is is delivered to the transmission lines 5a, 6a, and 3a.

Meanwhile, the fourth terminal 15 which have earlier received the token ring frame 30 performs a desired processing operation and thereafter delivers the token ring frame 30 to the buffer portion 51d through the transmission line 17a and the terminal receiving portion 52. Thus, the token ring frame 30 is stored in the buffer portion 51d. Since the backbone LAN frame 40 with the address set to itself is returned after circulation, the returned backbone LAN frame 40 is taken into the packeting/separating portion 51b, wherein the token ring frame 30 stored in the buffer portion 51d is incorporated into the backbone LAN frame 40 and, at the same time, the destination address is set to the address of the third node 2C being the downstream node in terms of the signal flow, and delivers the backbone LAN frame 40 to the transmission line 4a.

If the token ring frame 30 is not stored in the buffer portion 51d when the backbone LAN frame 40 returns to the second node 2B after its circulation, the backbone LAN frame 40 as it is is delivered to the transmission line 4a so as to continue to circulate through the transmission line of the backbone LAN 1 until the token ring frame 30 is stored in the buffer portion 51d.

Similar operation is performed in the other nodes 2C, 2D, and 2A. By so controlling, a token ring frame 30 can be transmitted to all of the terminals 8, 9, 10, 15, 18, and 21 in the predetermined sequence, whereby communications can be made between two terminals having the addresses set up in the address field 30b of the token ring frame 30.

Although, in the above description of the operations of data transfer in the communications system between LANs of different types, the case where data is transmitted through the first transmission line in a clockwise direction as indicated by the dotted line 24 in FIG. 1 has been described, the basic operations are the same even if data is transmitted through the second transmission line in a counterclockwise direction.

In the communications system between LANs of different types described above, since it is adapted such that the nodes 2A to 2D do not read the destination address stored in the token ring frame 30 but the token ring frame 30 is incorporated in the backbone LAN frame 40 and the destination address in the backbone LAN frame 40 is set to the address of the adjoining downstream node, the load on each of the nodes 2A to 2D is greatly reduced so that high-speed large-capacity communications become achievable.

Figure 4:
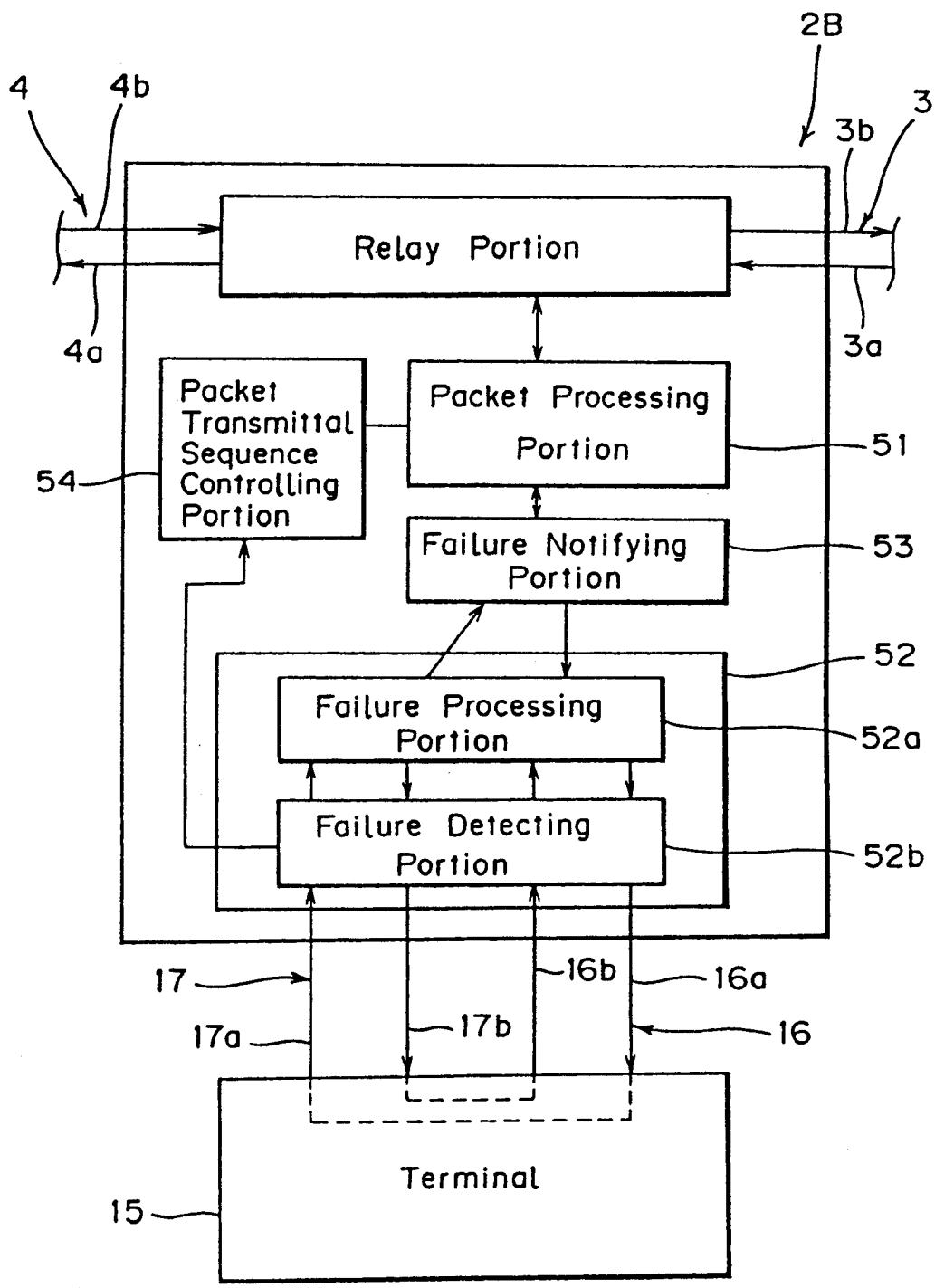
FIG. 4 is a block diagram showing a failure processing function of the node 2B shown in FIG. 1.

Referring now to FIG. 4, the structure of the failure processing function in each of the nodes 2A to 2D will be described. Since the first to fourth nodes 2A to 2D have the same function, the structure of the second node 2B is shown in FIG. 4 and description thereof will be given below for the convenience of explanation.

Referring to FIG. 4, in the terminal receiving portion 52, there are provided a failure processing portion 52a and a failure detecting portion 52b. Reference numeral 53 denotes a failure notifying portion and 54 denotes a packet transmittal sequence controlling portion.

The failure notifying portion 53 reads failure information detected in other nodes 2A, 2C, and 2D (including failure information of the token ring LANs belonging, and connected, to the nodes 2A, 2C, and 2D) and written in the failure information field 40e of the backbone LAN frame 40 and transmits the failure information to the failure processing portion 52a and, at the same time, transmits failure information detected in its own node 2B to the packet processing portion 51. In the packet processing portion 51, this failure information is written into the failure information field 40e of the backbone LAN frame 40.

The failure processing portion 52a controls switching of the transmission lines in accordance with failure information transmitted thereto from the failure notifying portion 53 or the failure detecting portion 52b. If, for example, the failure information sent over from the failure notifying portion 53 is such information that one of the dual transmission lines of the backbone LAN 1, i.e., the transmission line 3a - 4a - 5a - 6a, is broken, the line is switched to the other transmission line 3b - 4b - 5b - 6b so that the backbone LAN frame 40 is transmitted through the switched path.

The failure detecting portion 52b, when the transmission line on the upstream side of its own node 2B is broken, detects the failure and transmits the failure information of the detected failure to both the failure processing portion 52a and the packet transmittal sequence controlling portion 54. The packet transmittal sequence controlling portion 54, in accordance with the failure information sent over from the failure detecting portion 52b, transmits to the packet processing portion 51 such information that will control the sequence in which the backbone LAN frame 40 is transmitted through the nodes 2A to 2D. The packet processing portion 51, in accordance with this information, alters the address data in the destination address field 40c of the backbone LAN frame 40.

The method for failure processing performed when a transmission line is broken in the above described communications system between LANs of different types, as well as the operation of data transfer performed after the failure processing has been finished will be described below. The description will be given for each of cases of breakage of the transmission line: the first case where either one of the transmission lines of the backbone LAN 1 is broken, the second case where both of the transmission lines of the same are broken, the third case where either one of the transmission lines of the token ring LAN 7 is broken, and the fourth case where both of the transmission lines of the same are broken.

First Case

Figure 5:
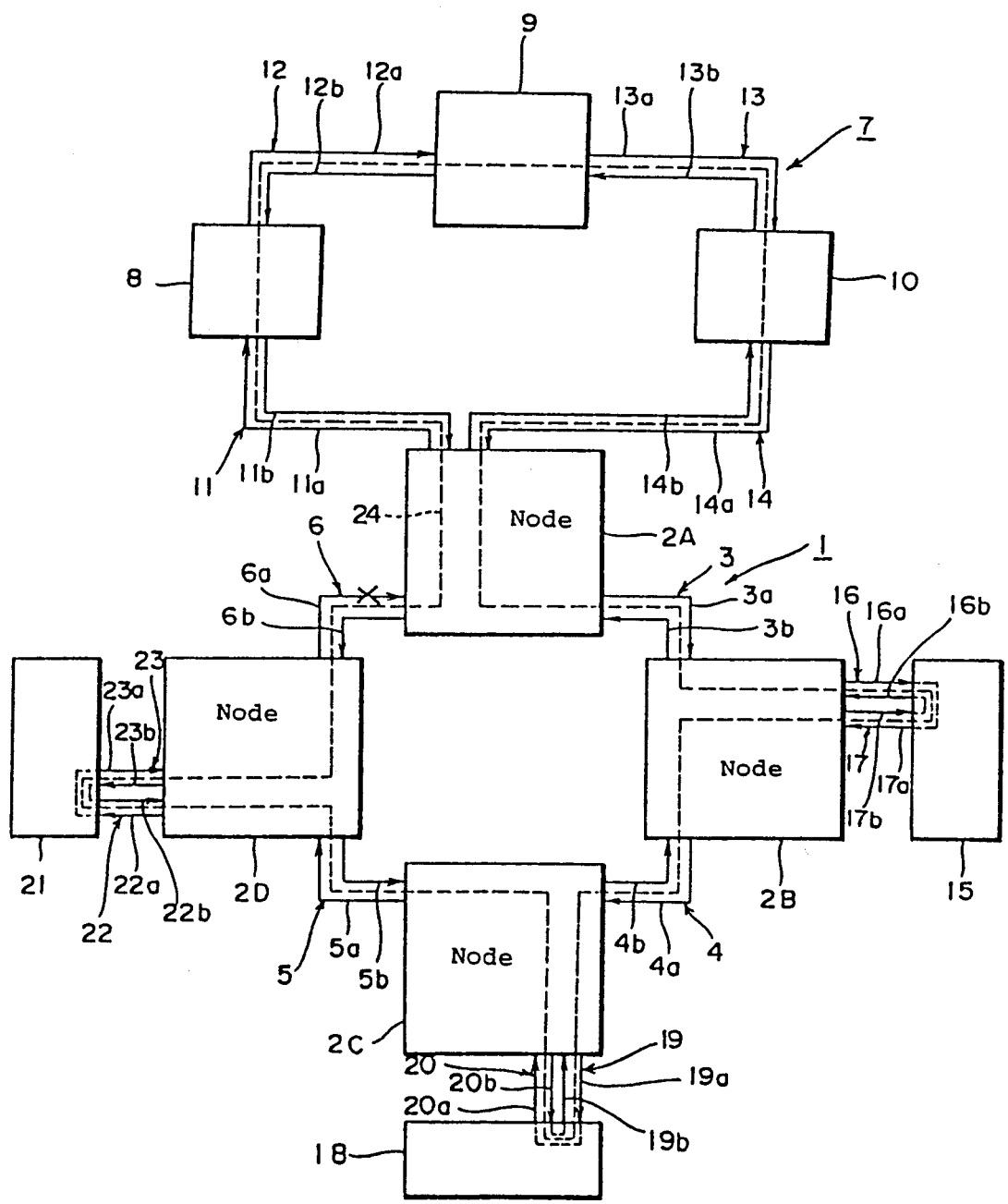
FIG. 5 is a diagram showing a state where the transmission line 6a of the backbone LAN 1 is broken.

The first case is shown in FIG. 5. FIG. 5 is a diagram showing a state where the transmission line 6a of the backbone LAN 1 is broken. Parts in FIG. 5 corresponding to those in FIG. I are denoted by like reference numerals.

In the communications system shown in FIG. 5, we assume that the token ring frame 30 is circulated in a clockwise direction transmitted, if it is started, for example, at the second terminal 9, through the second terminal 9 - third terminal 10 - fourth terminal 15 - fifth terminal 18 - sixth terminal 21 - first terminal 8 and then returned to the second terminal 9 again. Accordingly, the backbone LAN frame 40 is transmitted in the sequence of the nodes 2A - 2B - 2C - 2D.

Supposing now, as an example, that the first transmission line 6a is broken as indicated by the x mark in FIG. 5, a conduction signal for monitoring (hereinafter referred to as "monitor signal") which has been circulating through the loop formed of the transmission lines will be prevented from reaching the node 2A. The failure detecting portion 52b of the node 2A detects that the monitor signal has stopped conducting and recognizes that a failure due to breakage of line has occurred.

Then, the failure detecting portion 52b transmits detected failure information to the failure processing portion 52a and the packet transmittal sequence controlling portion 54. The failure processing portion 52a, upon receiving the failure information, switches the path through which the backbone LAN frame 40 is transmitted from the first transmission line 6a to the second transmission line 6b and, at the same time, transmits the failure information to the packet processing portion 51 through the failure notifying portion 53. Then, the packet processing portion 51 writes the failure information into the failure information field 40e of the backbone LAN frame 40. Meanwhile, the packet transmittal sequence controlling portion 54, in response to the failure information sent over from the failure detecting portion 52b, supplies the packet processing portion 51 with information for controlling the sequence of transmission of the backbone LAN frame 40 through the nodes 2A to 2D. The packet processing portion 51, in accordance with this information, alters address data in the destination address field 40c of the backbone LAN frame 40.

The backbone LAN frame 40 with the failure information written therein and with the address data altered is transmitted to the node 2B. In the node 2B (refer to FIG. 4), first the failure notifying portion 53 reads the failure information written in the failure information field 40e of the backbone LAN frame 40 and transmits the information to the failure processing portion 52a. The failure processing portion 52a switches the path through which the backbone LAN frame 40 is transmitted from the first transmission line 3a to the second transmission line 3b.

Similarly, in the following nodes 2C and 2D, the failure information in the backbone LAN frame 40 is read and the path through which the backbone LAN frame 40 is transmitted is switched from the first transmission line 4a to the second transmission line 4b and from the first transmission line 5a to the second transmission line 5b.

Through such switching of the transmission lines, the path through which the backbone LAN frame 40 is transmitted is switched to the path opposite to the previous direction of circulation, i.e., to the second transmission line 3b - 4b - 5b - 6b. Thereby, the backbone LAN frame 40 is circulated opposite to the previous direction. However, in the destination address field 40c of the backbone LAN frame 40, there is written, under the control of the packet transmittal sequence controlling portion 54, the address data for transmitting the backbone LAN frame 40 through the nodes 2A to 2D in the same sequence as before. Therefore, the sequence in which the backbone LAN frame 40 is transmitted through the nodes 2A-2D is kept unchanged.

More specifically, the token ring frame 30 delivered from the second terminal 9, for example, is transmitted through the transmission line 13a - third terminal 10 - transmission line 14a down to the node 2A, and in the node 2A, it is incorporated into the backbone LAN frame 40 and at the same time the address of the node 2B is written into the frame 40. Then, the backbone LAN frame 40 incorporating the token ring frame 30 is transmitted through the transmission line 6b - node 2D - transmission line 5b - node 2C - transmission line 4b down to the node 2B. In the node 2B, the token ring frame 30 is separated from the backbone LAN frame 40 and the separated token ring frame 30 is transmitted to the fourth terminal 15 through the transmission line 16a.

Upon completion of a desired processing operation in the fourth terminal 15, the token ring frame 30 is transmitted from the fourth terminal 15, through the transmission line 17a, to the node 2B, and in the node 2B, it is incorporated into the backbone LAN frame 40 and, at the same time, the address of the node 2C is written into the backbone LAN frame 40. The backbone LAN frame 40 incorporating the token ring frame 30 is transmitted through the transmission line 3b - node 2A - transmission line 6b - node 2D - transmission line 5b down to the node 2C, and in the node 2C, the token ring frame 30 is separated. This token ring frame 30 is transmitted to the fifth terminal 18 through the transmission line 19a, and transmitted from the fifth terminal 18 to the node 2C through the transmission line 20a, and incorporated into the backbone LAN frame 40 in the node 2C, and, at the same time, the address of the node 2D is written into the backbone LAN frame 40.

The backbone LAN frame 40 is transmitted through the transmission line 4b - node 2B - transmission line 3b - node 2A - transmission line 6b down to the node 2D, where the token ring frame 30 is separated. The token ring frame 30 is transmitted through the transmission line 22a - sixth terminal 21 - transmission line 23a back to the node 2D, and in the node 2D, it is incorporated into the backbone LAN frame 40, and, at the same time, the address of the node 2A is written into the frame 40.

Further, the backbone LAN frame 40 is transmitted through the transmission line 5b - node 2C - transmission line 4b - node 2B - transmission line 3b down to the node 2A, where the token ring frame 30 is separated. Then, the token ring frame 30 is transmitted through the transmission line 11a - first terminal 8 - transmission line 12a back to the second terminal 9.

Thus, the token ring frame 30 is transmitted in the sequence of the second terminal 9 - third terminal 10 - fourth terminal 15 - fifth terminal 18 - sixth terminal 21 - first terminal 8 the same as before, and therefore, the accessing sequence is kept unchanged even if the transmission line is changed over as described above.

Second Case

Figure 6:
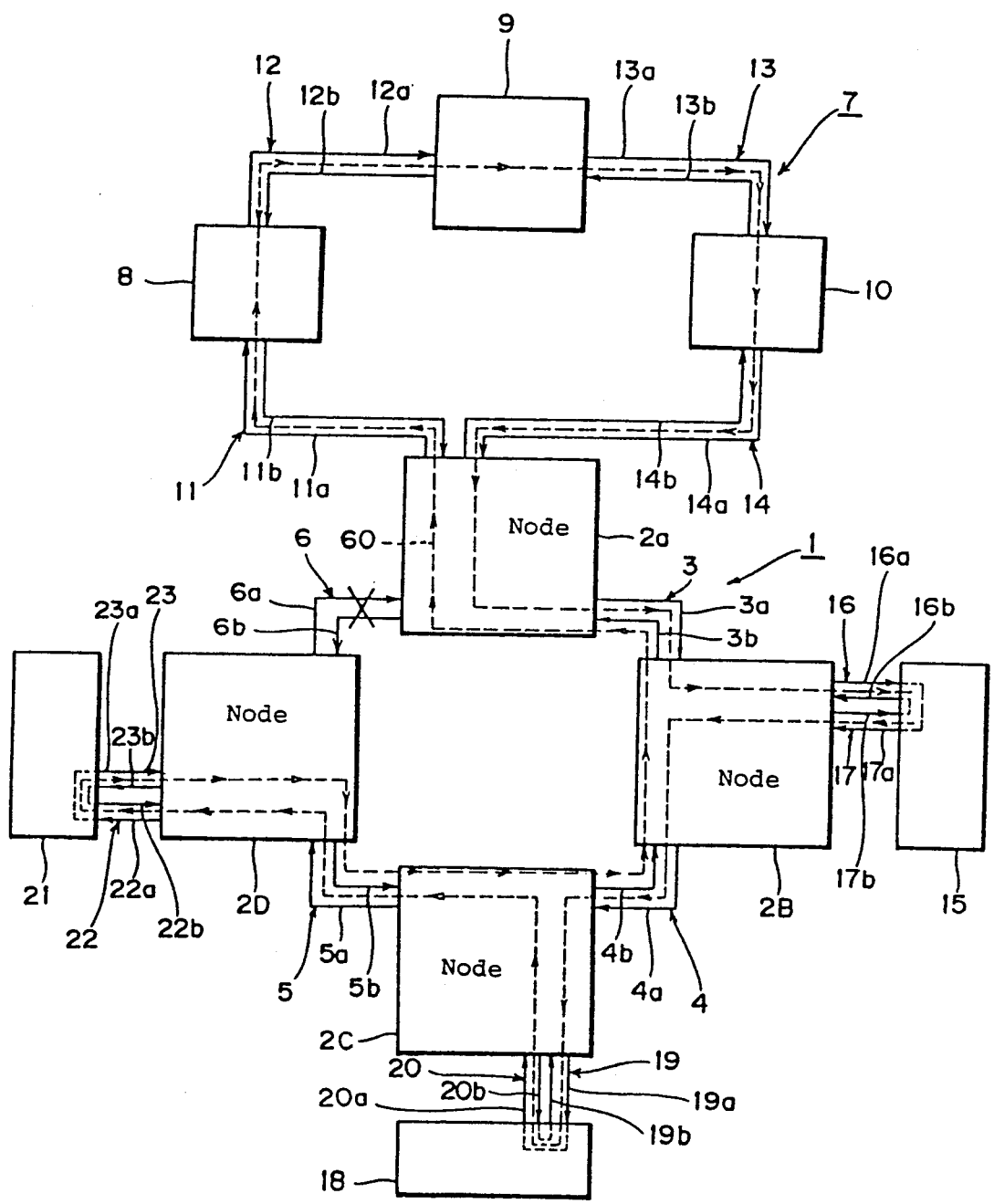
FIG. 6 is a diagram showing a state where the transmission line 6a and 6b of the backbone LAN 1 are broken.

The second case is shown in FIG. 6. FIG. 6 shows a state where both the transmission lines 6a and 6b of the backbone LAN 1 are broken. Parts in FIG. 6 corresponding to those in FIG. 1 are denoted by like reference numerals.

In the communications system shown in FIG. 6, we assume that the token ring frame 30 is circulated around, the same as in the above described first case, transmitted through the path of the transmission line 13a, - . . . . - 12a, that is, transmitted through the second terminal 9 - third terminal 10 - fourth terminal 15 - fifth terminal 18 - sixth terminal 21 - first terminal 8.

Now, as an example, we assume that the first transmission line 6a and the second transmission line 6b are broken as indicated by the X mark in FIG. 6. Then, monitor signals which have so far been circulated through the respective transmission lines become unable to reach the node 2A. The failure detecting portion 52b in the node 2A detects that the monitor signals have been stopped and thereby it recognizes that both the transmission lines have been broken.

The failure detecting portion 52b transmits failure information obtained through the detection to the failure processing portion 52a and the packet transmittal sequence controlling portion 54. The failure processing portion 52a transmits the failure information to the packet processing portion 51 through the failure notifying portion 53. The packet processing portion 51 writes tile failure information into the failure information field 40e of the backbone LAN frame 40. Meanwhile, the packet transmittal sequence controlling portion 54, in accordance with the failure information sent over from the failure detecting portion 52b, supplies the packet processing portion 51 with information for controlling the sequence of transmission of the backbone LAN frame 40 through the nodes 2A to 2D. The packet processing portion 51, in accordance with the information, alters the address data in the destination address field 40c of the backbone LAN frame 40.

The backbone LAN frame 40 with the failure information written therein and with the address data altered is transmitted to the node 2B. In the node 2B (refer to FIG. 4), first the failure notifying portion 53 reads the failure information written in the failure information field 40e of the backbone LAN frame 40 and transmits the information to the failure processing portion 52a. The failure processing portion 52a controls such that the backbone LAN frame 40 is transmitted to both the first transmission line 3a and the second transmission line 3b.

Then, in the node 2C, the failure information in the backbone LAN frame 40 is read and switching of the transmission path is performed so that the backbone LAN frame 40 is transmitted to both the first transmission line 4a and the second transmission line 4b. Further, in the node 2D, the failure information in the backbone LAN frame 40 is read and switching of the transmission path is performed such that the backbone LAN frame 40 is transmitted to both the first transmission line 5a and the second transmission line 5b and, in addition, a loop back arrangement is made in this node 2D.

When such switching of the path is performed, the path as indicated by the dotted line 60 in FIG. 6 is formed and data comes to be transmitted in the direction indicated by the arrow heads in the broken line 60.

More specifically, the token ring frame 30 delivered from the second terminal 9 is transmitted through the transmission line 13a - third terminal 10 - transmission line 14 down to the node 2A, and in the node 2A, it is incorporated into the backbone LAN frame 40. The backbone LAN frame 40 incorporating the token ring frame 30 is transmitted to the node 2B through the transmission line 3a, and in the node 2B, the token ring frame 30 is separated. The token ring frame 30 is transmitted from the node 2B to the fourth terminal 15 through the transmission line 16a. Upon completion of a desired processing operation in the fourth terminal 15, the token ring frame 30 is transmitted from the fourth terminal 15 to the node 2B through the transmission line 17a, and it is incorporated into the backbone LAN frame 40 in the node 2B.

The backbone LAN frame 40 incorporating the token ring frame 30 is transmitted to the node 2C through the transmission line 4a. Then, the token ring frame 30 is transmitted from the node 2C to the fifth terminal 18 through the transmission line 19a, and transmitted from the fifth terminal 18 to the node 2C through the transmission line 20a, to be incorporated into the backbone LAN frame 40 in the node 2C.

The backbone LAN frame 40 incorporating the token ring frame 30 is transmitted to the node 2D through the transmission line 5a. Then, the token ring frame 30 is transmitted from the node 2D to the sixth terminal 21 through the transmission line 22a, and transmitted from the sixth terminal 21 to the node 2D through the transmission line 23a, to be incorporated into the backbone LAN frame 40 in the node 2D. At the time of the incorporation, the address data for transmission to the node 2A is written into the destination address field of the backbone LAN frame 40. Therefore, the backbone LAN frame 40 delivered from the node 2D is transmitted to the node 2A by way of the transmission line 5b - node 2C - transmission line 4b - node 2B - transmission line 3b.

In the node 2A, the token ring frame 30 is separated. The token ring frame 30 is transmitted through the transmission line 11a - first terminal 8 - transmission line 12a back to the second terminal 9.

Thus, the token ring frame 30 is transmitted in the sequence of the second terminal 9 - third terminal 10 - fourth terminal 15 - fifth terminal 18 - sixth terminal 21 - first terminal 8 the same as before, and therefore, the sequence of access to the terminals is kept unchanged even if the transmission line is switched over.

Third Case

Figure 7:
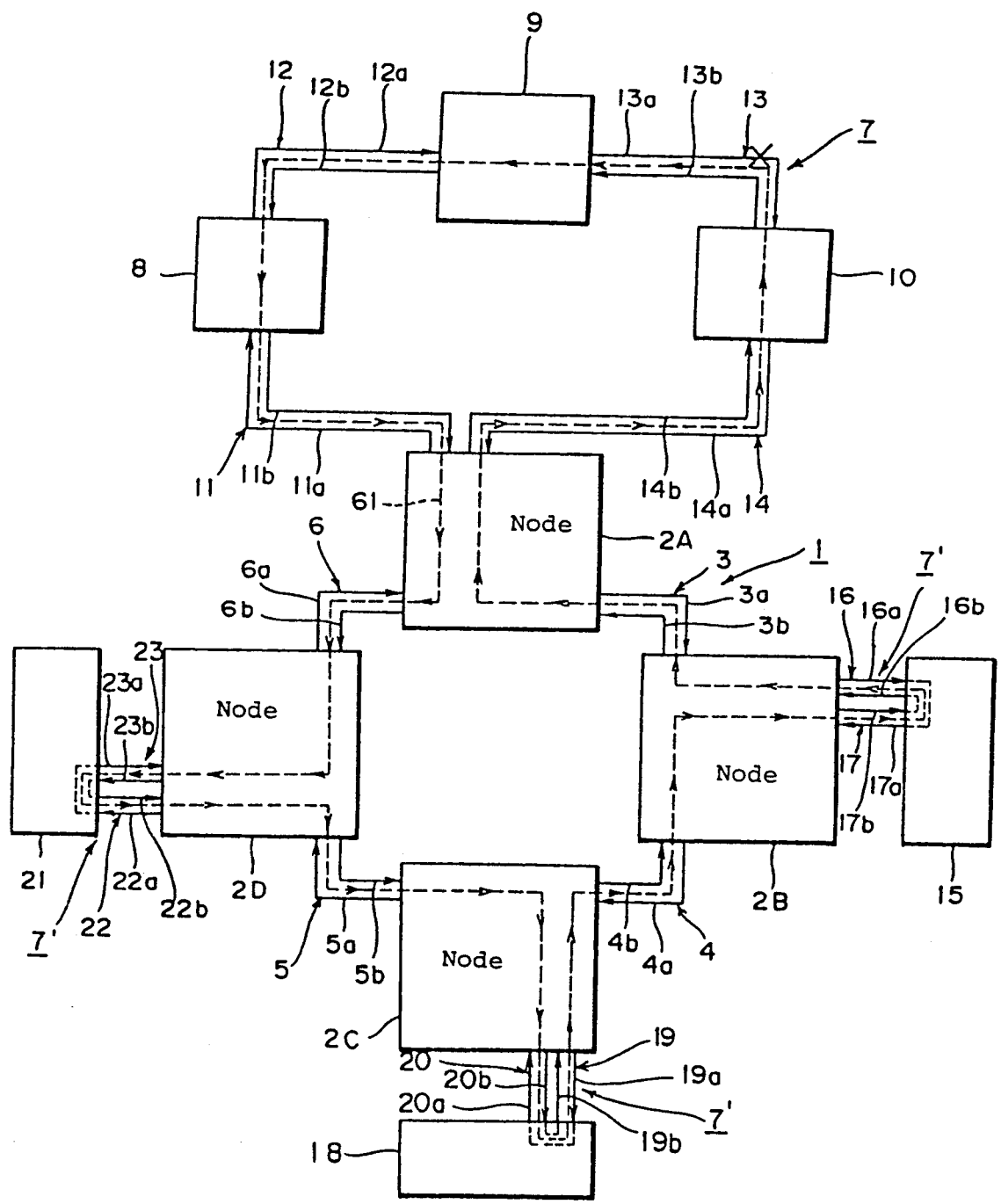
FIG. 7 is a diagram showing a state where the transmission line 13a of the token ring LAN 7 is broken.

The third case is shown in FIG. 7. FIG. 7 is a diagram showing a state where the transmission line 13a of the token ring LAN 7 is broken. Parts in FIG. 7 corresponding to those in FIG. 1 are denoted by like reference numerals.

In the communications system shown in FIG. 7, we assume that the token ring frame 30 is circulated round, the same as in the above described second case, transmitted through the transmission line 13a, -.... - 12a, that is, transmitted through the second terminal 9 - third terminal 10 - fourth terminal 15 - fifth terminal 18 - sixth terminal 21 - first terminal 8.

Now, as an example, we assume that the first transmission line 13a is broken as indicated by the X mark in FIG. 7. Then, the monitor signal which has so far been circulated through the loop formed of the transmission lines becomes unable to reach the node 2A. The failure detecting portion 52b in the node 2A detects that the monitor signal has been stopped and thereby it recognizes that a failure due to breakage of line has occurred.

The failure detecting portion 52b transmits failure information obtained through the detection to the failure processing portion 52a and the packet transmittal sequence controlling portion 54. The failure processing portion 52a, upon receipt of the failure information, transmits the failure information to the token ring LAN 7. The token ring LAN 7 switches the path through which the token ring frame 30 is transmitted from the first transmission line 11a - 12a - 13a - 14a to the second transmission line 11b - 12b - 13b - 14b. Further, the failure information is transmitted to the packet processing portion 51, and the packet processing portion 51 writes the failure information into the backbone LAN frame 40.

Meanwhile, the packet transmittal sequence controlling portion 54, in accordance with the failure information sent over from the failure detecting portion 52b, supplies the packet processing portion 51 with information for controlling the sequence of transmission of the backbone LAN frame 40 through the nodes 2A to 2D. The packet processing portion 51, in accordance with this information, alters the address data in the destination address field 40c of the backbone LAN frame 40.

Further, the backbone LAN frame 40 with the failure information written therein and with the address data altered is transmitted to the node 2B. In the node 2B (refer to FIG. 4), first, the failure notifying portion 53 reads the failure information written in the backbone LAN frame 40 and transmits the information to the failure processing portion 52a. The failure processing portion 52a intentionally cut off the monitor signal transmitted through the transmission line 16a. Accordingly, the terminal 15 switches the path through which the token ring frame 30 is transmitted from the first transmission line 16a - 17a to the second transmission line 16b - 17b.

The failure information in the backbone LAN frame 40 is similarly read in the following nodes 2C and 2D, the paths through which the token ring frame 30 is transmitted are switched from the first transmission lines 19a - 20a and 22a - 23a to the second transmission lines 19b - 20b and 22b - 23b, respectively.

When switching of the paths is performed as described above, though no switching of the transmission lines of the backbone LAN 1 is made, the switching from the first transmission line to the second transmission line is performed in the token ring LANs 7 and 7' connected to each node. Accordingly the token ring frame 30 transmitted through the switched transmission line comes to be transmitted in the direction indicated by the arrow heads in the broken line 61 shown in FIG. 7, that is, opposite to the previous direction.

More specifically, the token ring frame 30 delivered from the second terminal 9 is transmitted through the transmission line 12b - first terminal 8 - transmission line 11b down to the node 2A, and it is incorporated into the backbone LAN frame 40 in the node 2A, and, at the same time, the address of the node 2D is written into the frame 40. The backbone LAN frame 40 incorporating the token ring frame 30 is transmitted through the transmission line 3a - node 2B transmission line 4a - node 2C - transmission line 5a down to the node 2D and the token ring frame 30 is separated in the node 2D. From the node 2D, the token ring frame 30 is transmitted to the sixth terminal 21 through the transmission line 23b. Upon completion of a desired processing operation in the sixth terminal 21, the token ring frame 30 is transmitted from the sixth terminal 21 to the node 2D through the transmission line 22b and incorporated into the backbone LAN frame 40 in the node 2D.

The backbone LAN frame 40 incorporating the token ring frame 30 is transmitted through the transmission line 6a - node 2A - transmission line 3a - node 2B - transmission line 4a down to the node 2C and, in the node 2C, the token ring frame 30 is separated. The token ring frame 30 is transmitted from the node 2C to the fifth terminal 18 through the transmission line 20b, and from the fifth terminal 18 to the node 2C through the transmission line 19b, to be incorporated into the backbone LAN frame 40 in the node 2C.

The backbone LAN frame 40 incorporating the token ring frame 30 is transmitted through the transmission line 5a -node 2D - transmission line 6a - node 2A - transmission line 3a down to the node 2B, and the token ring frame 30 is separated in the node 2B. The token ring frame 30 is transmitted from the node 2B to the fourth terminal 15 through the transmission line 17b and from the fourth terminal 15 to the node 2B through the transmission line 16b, to be incorporated into the backbone LAN frame 40 in the node 2B.

The backbone LAN frame 40 incorporating the token ring frame 30 is transmitted through the transmission line 4a - node 2C - transmission line 5a - node 2D - transmission line 6a down to the node 2A and the token ring frame 30 is separated in the node 2A. The token ring frame 30 is transmitted from the node 2A to the third terminal 10 through the transmission line 14b, and then returned to the second terminal 9 through the transmission line 13b.

Thus, the token ring frame 30 is transmitted in the direction opposite to the previous direction in the sequence of the second terminal 9 - first terminal 8 - sixth terminal 21 - fifth terminal 18 - fourth terminal 15 - third terminal 10. Although the token ring frame 30 is thus transmitted opposite to the previous direction, because the sequence of connections to the terminals is the same as before and the token ring LAN is cognizant of the fact that the sequence of accesses is reversed, there is no problem in making communications.

Fourth Case

Figure 8:
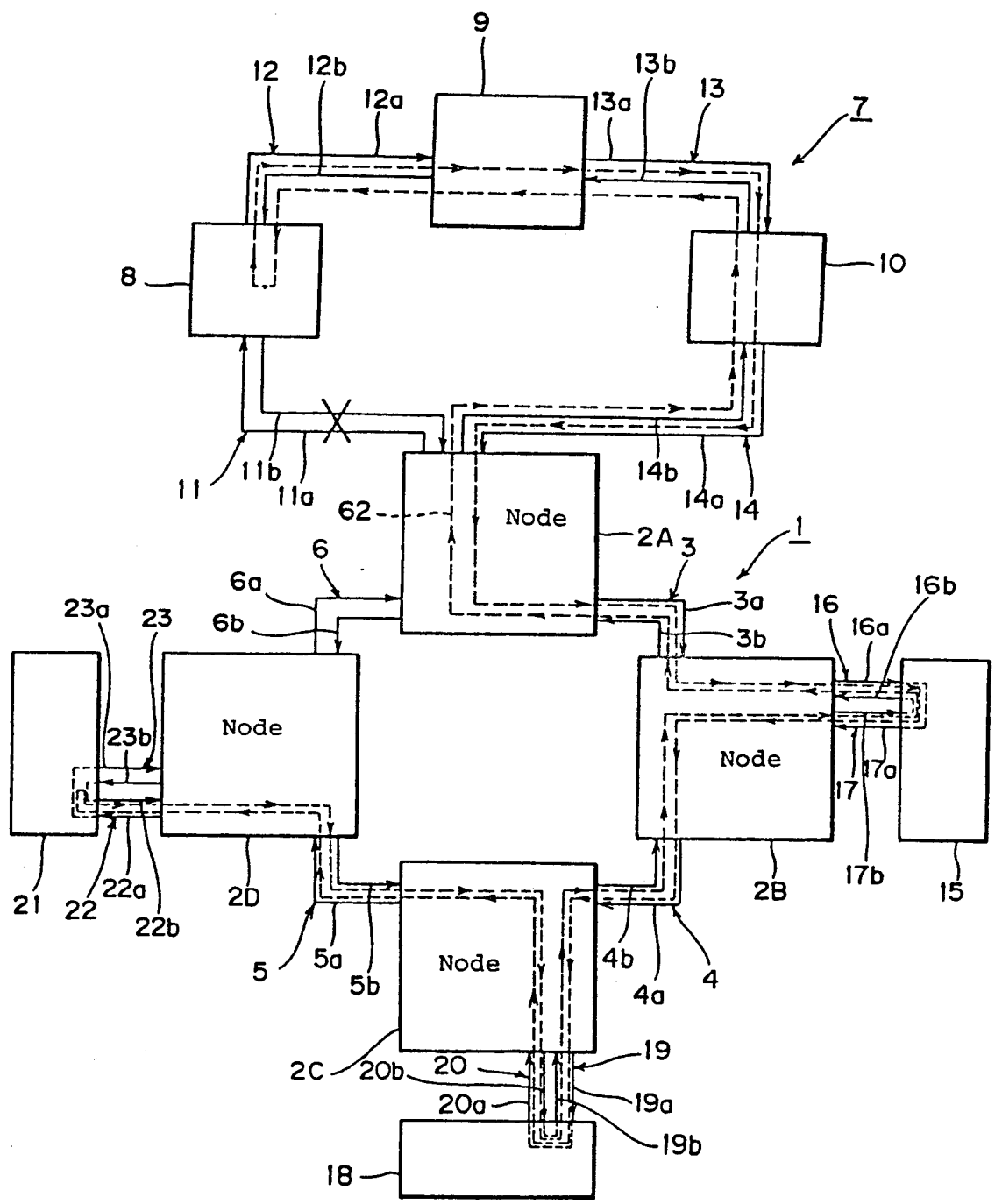
FIG. 8 is a diagram showing a state where the transmission lines 11a and 11b of the token ring LAN 7 are broken.

FIG. 8 shows the fourth case. FIG. 8 is a diagram showing a state where the transmission lines 11a and 11b of the token ring LAN 7 are broken. Parts in FIG. 8 corresponding to those in FIG. 1 are denoted by like reference numerals.

Referring to FIG. 8, we assume that the token ring frame 30 is circulated around, the same as in the above described third case, transmitted through the transmission line 13a, - . . . 12a, that is, transmitted through the second terminal 9 - third terminal 10 - fourth terminal 15 - fifth terminal 18 - sixth terminal 21 - first terminal 8.

Now, as an example, we assume that the first transmission line 11a and the second transmission line 11b are broken as indicated by the X mark in FIG. 8. Then, monitor signals which have so far been circulated through both the transmission lines become unable to reach the node 2A. The failure detecting portion 52b in the node 2A detects that the monitor signals have been stopped and thereby it recognizes that both the transmission lines have been broken.

Failure information detected by the failure detecting portion 52b is transmitted to the packet processing portion 51. The packet processing portion 51 writes the information into the failure information field 40e of the backbone LAN frame 40. The failure information is also transmitted to the packet transmittal sequence controlling portion 54, and the packet transmittal sequence controlling portion 54 supplies the packet processing portion 51 with information for controlling the sequence of transmission of the backbone LAN frame 40 through the nodes 2A-2D, and the packet processing portion 51, in accordance with this information, alters the address data in the destination address field 40c of the backbone LAN frame 40.

In the node 2A, the address of the node 2B is set Lip in the address field of the backbone LAN frame 40. The backbone LAN frame 40 transmitted to the node 2B is accepted by the node 2B and taken into it, and the token ring frame 30 is transmitted to the terminal 15. The token ring frame 30 from the terminal 15 is incorporated into the backbone LAN frame 40 coming over to the node 2B on its way of circulation and the address of the node 2C is set up in the frame 40. Similar processing is performed in the node 2C and the address of the node 2D is set up in the backbone LAN frame 40.

The backbone LAN frame 40 is accepted by the node 2D and the token ring frame 30 is separated therefrom in the node 2D and the separated token ring frame 30 is transmitted to the terminal 21. The token ring frame 30 thereafter returned from the terminal 21 is incorporated into the backbone LAN frame 40 in the node 2D but, at this time, the address of the node 2C, not that of the node 2A, is set up in the address field of the backbone LAN frame 40. The purpose of setting up the address of the node 2C at this time is to keep the preset sequence of access to the terminals. More specifically, if the address of the node 2A is set up at this time, the backbone LAN frame 40 will be acquired by the node 2A and the token ring frame 30 will be separated from the backbone LAN frame 40 in the node 2A, and, then, the token ring frame will not be delivered to the first terminal 8 on account of the broken transmission line 11, but be delivered to the third terminal 10, from which it follows that the third terminal 10 is accessed next to the sixth terminal 21.

To avoid it, the token ring frame 30 is caused to turn back at the node 2D and, thus, the token ring frame 30 is passed through the sixth terminal 21 - fifth terminal 18 - fourth terminal 15 again and reaches the third terminal 10. The token ring frame 30 transmitted to the third terminal 10 is further transmitted to the second terminal 9 and the first terminal 8 and, then, returned to the second terminal 9. That is, the token ring frame 30 is transmitted through the path indicated by the broken line 62 in FIG. 8.

Accordingly, the token ring frame 30 is, the same as in the case of normal communications, transmitted, sequentially, through the second terminal 9 - third terminal 10 - fourth terminal 15 - fifth terminal 18 - sixth terminal 21, turned back at the sixth terminal 21, and transmitted through the same terminals in reverse sequence down to the first terminal 8. Since the transmission controlled as described above is performed, the sequence of access to the terminals is not changed even if the transmission line is switched over.

Although the embodiments described above were of the arrangement in which token ring LANs are connected to a backbone LAN, the present invention is not limited to such arrangement. For example, time sharing LANs, which have not been connectable in the conventional communications system between LANs of different types, can be connected as branch LANs.

INDUSTRIAL APPLICABILITY

In the communications system of the present invention constituted of a backbone LAN with a plurality of branch LANs connected thereto, it is adapted, when communication is made between a terminal of one branch LAN and a terminal of another branch LAN, such that the destination address of the branch LAN frame is not read by the node having data transferring function and failure processing function but the address in the backbone LAN frame incorporating the branch LAN frame is set to the address of the adjoining node on the downstream side and the branch LAN frame accesses all of the terminals in a predetermined sequence. Accordingly, the load on the node can be greatly reduced and it becomes possible to increase the throughput of the node to thereby achieve high-speed large-capacity communications.

Further, when any of the transmission lines is broken, a controlled change of the transmission path is made, and thereby, tile sequence of access to the terminals is either kept unchanged, or, when the sequence of access is changed, it is completely reversed. By controlling the system in the described manner, the token ring frame can be transferred through terminals correctly even when any of the transmission line is broken.

We claim:

1. A communication system for communicating between LANs of different types constituted of a backbone LAN having a plurality of nodes connected to form a ring through a pair of backbone LAN transmission lines and a plurality of branch LANs each having a plurality of terminals connected thereto, one of the branch LANs being connected to the backbone LAN at each node, said communications system being adapted such that a branch LAN frame containing the addresses of terminals communicating with each other is transmitted through the branch LANs and a backbone LAN frame containing the address of a destination is circulated through the backbone LAN, said communication system comprising:

means provided in each of said nodes for incorporating a branch LAN frame outputted from one of the terminals of one of the branch LANs into a backbone LAN frame;

means provided in each of the nodes for writing an address of an adjoining node on the downstream side of the ring into the backbone LAN frame in response to the incorporation of the branch LAN frame into the backbone LAN frame;

means provided in each of the nodes for reading the address in the backbone LAN frame; and means provided in each of the nodes for separating the branch LAN frame from the backbone LAN frame when the address in the backbone LAN frame read by the address reading means coincides with an address of each of the nodes, said branch LAN frame separating means in cooperation with said address writing means and said address reading means allowing the branch LAN frame to be transmitted through the terminals in a predetermined sequence.

2. A communication system for communicating between LANs of different types according to claim 1, wherein the backbone LAN frame includes a data field for holding the branch LAN frame, a destination address field into which an address of the node to which the backbone LAN frame is to be delivered next is written, and a message field for holding a message indicating that the branch LAN frame is incorporated therein.

3. A communication system for communicating between LANs of different types according to claim 2, wherein the branch LANs comprise token ring LANs and the branch LAN frame comprises a token ring frame which includes a data field for holding data, an address field for holding address data of the one of the terminals and address data of another one of the terminals to receive the branch LAN frame, and a token indicating that a specific one of the terminals has access authority.

4. A communication system for communicating between LANs of different types according to claim 2, wherein the backbone LAN frame further includes a failure information field for holding failure information of the pair of backbone LAN transmission lines and of a branch LAN transmission line, and each of the nodes further includes failure processing means responsive to the failure information in the failure information field for changing a path through which at least one of the backbone LAN frame and the branch LAN frame is transmitted.

5. A communication system for communicating between LANs of different types according to claim 4, wherein said failure processing means includes means for detecting a failure of the pair of backbone LAN transmission lines at an immediate upstream side of each of said nodes and means responsive to the failure detection made by said failure detecting means for changing the path through which the at least one of the backbone LAN frame and the branch LAN frame is transmitted.

6. A communication system for communicating between LANs of different types constituted of a backbone LAN having a plurality of nodes connected to form a ring through a pair of backbone LAN transmission lines and a plurality of branch LANs each having a plurality of terminals connected thereto, one of the branch LANs being connected to the backbone LAN at each node, said communications system being adapted such that a branch LAN frame containing the addresses of terminals communicating with each other is transmitted through the branch LANs and a backbone LAN frame containing the address of a destination is circulated through the backbone LAN, said communication system comprising:

means provided in each of said nodes for incorporating a branch LAN frame outputted from one of the terminals of one of the branch LANs into a backbone LAN frame;

means provided in each of the nodes for writing an address of an adjoining node on the downstream side of the ring into the backbone LAN frame in response to the incorporation of the branch LAN frame into the backbone LAN frame;

means provided in each of the nodes for reading the address of in the backbone LAN frame;

means provided in each of the nodes for separating the branch LAN frame from the backbone LAN frame when the address of the backbone LAN frame read by the address reading means coincides with an address of each of the nodes, the branch LAN frame is adapted to be transmitted through the terminals in a predetermined sequence;

the backbone LAN frame further includes a data field for holding the branch LAN frame, a destination address field into which an address of the node to which the backbone LAN frame is to be delivered next is written, and a message field for holding a message indicating that the branch LAN frame is incorporated therein:

the backbone LAN frame further includes a failure information field for holding failure information of the pair of backbone LAN transmission lines and of a branch LAN transmission line, and each of the nodes further includes a failure processing means responsive to the failure information in the failure information field for changing a path through which at least one of the backbone LAN frame and the branch LAN frame is transmitted; and when one of the pair of backbone LAN transmission lines is broken at a portion, failure information in accordance with the breakage is put into the failure information field of the backbone LAN frame by said failure processing means of one of the nodes located on the downstream side of the portion of the breakage, the backbone LAN frame containing the failure information that is transmitted to each of the nodes, and said failure processing means of each of the nodes, in response to the failure information transmitted thereto, switches one of the pair of backbone LAN transmission lines to the other of the backbone LAN transmission lines such that the branch LAN frame is transmitted through all of the terminals in a predetermined sequence.

7. A communication system for communicating between LANs of different types constituted of a backbone LAN having a plurality of nodes connected to form a ring through a pair of backbone LAN transmission lines and a plurality of branch LANs each having a plurality of terminals connected thereto, one of the branch LANs being connected to the backbone LAN at each node, said communications system being adapted such that a branch LAN frame containing the addresses of terminals communicating with each other is transmitted through the branch LANs and a backbone LAN frame containing the address of a destination is circulated through the backbone LAN, said communication system comprising:

means provided in each of said nodes for incorporating a branch LAN frame outputted from one of the terminals of one of the branch LANs into a backbone LAN frame;

means provided in each of the nodes for writing an address of an adjoining node on the downstream side of the ring into the backbone LAN frame in response to the incorporation of the branch LAN frame into the backbone LAN frame;

means provided in each of the nodes for reading the address of in the backbone LAN frame;

means provided in each of the nodes for separating the branch LAN frame from the backbone LAN frame when the address in the backbone LAN frame read by the address reading means coincides with an address of each of the nodes, the branch LAN frame is adapted to be transmitted through the terminals in a predetermined sequence;

the backbone LAN frame further includes a data field for holding the branch LAN frame, a destination address field into which an address of the node to which the backbone LAN frame is to be delivered next is written, and a message field for holding a message indicating that the branch LAN frame is incorporated therein;

the backbone LAN frame further includes a failure information field for holding failure information of the pair of backbone LAN transmission lines and of a branch LAN transmission line, and each of the nodes further includes a failure processing means responsive to the failure information in the failure information field for changing a path through which at least one of the backbone LAN frame and the branch LAN frame is transmitted; and when one of the pair of backbone LAN transmission lines is broken at a portion, failure information in accordance with the breakage is put into the failure information field of the backbone LAN frame by said failure processing means of one of the nodes located on the upstream and the one of the said nodes located on the downstream side of the portion of the breakage, the backbone LAN frame containing the failure information is transmitted to each of the nodes, and said failure processing means of each of the nodes, in response to the failure information transmitted thereto, switches a path through which the backbone LAN frame is transmitted such that the branch LAN frame is transmitted through all of the terminals in a predetermined sequence.

8. A communication system for communicating between LANs of different types constituted of a backbone LAN having a plurality of nodes connected to form a ring through a pair of backbone LAN transmission lines and a plurality of branch LANs each having a plurality of terminals connected thereto, one of the branch LANs being connected to the backbone LAN at each node, said communications system being adapted such that a branch LAN frame containing the addresses of terminals communicating with each other is transmitted through the branch LANs and a backbone LAN frame containing the address of a destination is circulated through the backbone LAN, said communication system comprising:

means provided in each of said nodes for incorporating a branch LAN frame outputted from one of the terminals of one of the branch LANs into a backbone LAN frame;

means provided in each of the nodes for writing an address of an adjoining node on the downstream side of the ring into the backbone LAN frame in response to the incorporation of the branch LAN frame into the backbone LAN frame;

means provided in each of the nodes for reading the address of in the backbone LAN frame;

means provided in each of the nodes for separating the branch LAN frame from the backbone LAN frame when the address in the backbone LAN frame read by the address reading means coincides with an address of each of the nodes, the branch LAN frame is adapted to be transmitted through the terminals in a predetermined sequence;

the backbone LAN frame further includes a data field for holding the branch LAN frame, a destination address field into which an address of the node to which the backbone LAN frame is to be delivered next is written, and a message field for holding a message indicating that the branch LAN frame is incorporated therein;

the backbone LAN frame further includes a failure information field for holding failure information of the pair of backbone LAN transmission lines and of a branch LAN transmission line, and each of the nodes further includes a failure processing means responsive to the failure information in the failure information field for changing a path through which at least one of the backbone LAN frame and the branch LAN frame is transmitted; and the branch LAN transmission line further comprises a pair of branch LAN transmission lines, and wherein one of the pair of branch LAN transmissions lines is broken at a portion, failure information in accordance with the breakage is put into the failure information field of the backbone LAN frame by said failure processing means of one of the nodes to which the corresponding one of the branch LANs having the breakage is connected, the backbone LAN frame containing the failure information is transmitted to each of the nodes, and said failure processing means of each of the nodes, in response to the failure information transmitted thereto, switches one of the pair of branch LAN transmission lines to the other of the pair of branch LAN transmission lines, while not switching the pair of backbone LAN transmission lines, such that the branch LAN frame is transmitted through all of the terminals in a predetermined sequence.

9. A communication system for communicating between LANs of different types constituted of a backbone LAN having a plurality of nodes connected to form a ring through a pair of backbone LAN transmission lines and a plurality of branch LANs each having a plurality of terminals connected thereto, one of the branch LANs being connected to the backbone LAN at each node, said communications system being adapted such that a branch LAN frame containing the addresses of terminals communicating with each other is transmitted through the branch LANs and a backbone LAN frame containing the address of a destination is circulated through the backbone LAN, said communication system comprising:

means provided in each of said nodes for incorporating a branch LAN frame outputted from one of the terminals of one of the branch LANs into a backbone LAN frame;

means provided in each of the nodes for writing an address of an adjoining node on the downstream side of the ring into the backbone LAN frame in response to the incorporation of the branch LAN frame into the backbone LAN frame;

means provided in each of the nodes for reading the address of in the backbone LAN frame;

means provided in each of the nodes for separating the branch LAN frame from the backbone LAN frame when the address in the backbone LAN frame read by the address reading means coincides with an address of each of the nodes, the branch LAN frame is adapted to be transmitted through the terminals in a predetermined sequence;

the backbone LAN frame further includes a data field for holding the branch LAN frame, a destination address field into which an address of the node to which the backbone LAN frame is to be delivered next is written, and a message field for holding a message indicating that the branch LAN frame is incorporated therein;

the backbone LAN frame further includes a failure information field for holding failure information of the pair of backbone LAN transmission lines and of a branch LAN transmission line, and each of the nodes further includes a failure processing means responsive to the failure information in the failure information field for changing a path through which at least one of the backbone LAN frame and the branch LAN frame is transmitted; and the branch LAN transmission further comprises a pair of branch LAN transmission lines when and wherein both of the pair of branch LAN transmission lines are broken at a portion, failure information in accordance with the breakage is put into the failure information field of the backbone LAN frame by said failure processing means of one of the nodes to which one of the branch LANs having the breakage is connected, the backbone LAN frame containing the failure information that is transmitted to each of the nodes, and said failure processing means of each of the nodes, in response to the failure information transmitted thereto, switches a path within the one of the branch LANs through which the branch LAN frame is transmitted, while not switching the pair of backbone LAN transmission lines, such that the branch LAN frame is transmitted through all of the terminals in a predetermined sequence.

* * * * *

UNITED STATES PATENT AND TRADEMARK OFFICE
CERTIFICATE OF CORRECTION

PATENT NO. : 5,315,582
DATED : May 24, 1994
INVENTOR(S) : Toshiaki Morizono et al.

It is certified that error appears in the above-indentified patent and that said Letters Patent is hereby corrected as shown below:

Col. 2, line 43, before "predetermined" delete "1".

Col. 3, line 31, after "LAN", "I" should be --1--.

Col. 5, line 67, "an" should be --a--.

Col. 6, line 6, "have" should be --has--.

Signed and Sealed this

Thirteenth Day of September, 1994

Attest:

BRUCE LEHMAN

Attesting Officer

Commissioner of Patents and Trademarks